3,135,584
CYCLIC PROCESS FOR MAKING CHLORINE FROM AMMONIUM CHLORIDE

Richard Brooks and Harry Smith, Northwich, England, assignors to Imperial Chemical Industries Limited, London, England, a corporation of Great Britain
No Drawing. Filed Oct. 24, 1962, Ser. No. 232,893
Claims priority, application Great Britain Nov. 14, 1961
4 Claims. (Cl. 23—219)

This invention relates to a novel process for making chlorine, particularly to a cyclic process for making chlorine from ammonium chloride.

Chlorine is made industrially on a large scale by the electrolysis of sodium chloride brine which yields at the same time equivalent quantities of caustic soda. When the demand for chlorine becomes so great that the equivalent caustic soda produced exceeds what industry needs, this process becomes less economic and it becomes desirable to find alternative processes for making chlorine that do not yield caustic soda at the same time. Chlorine-containing starting materials suitable for such alternative processes include hydrogen chloride, available as a by-product from organic chlorinations, ammonium chloride, for example as obtainable from an ammonia-soda process, and other readily available chlorides, for example sodium chloride. Of these ammonium chloride and hydrogen chloride are the most attractive since some processes starting with sodium chloride, for example electrolysis of the fused salt, or its reaction with nitric acid to give nitrosyl chloride, or its reaction with sulphur trioxide, possess unfavourable characteristics.

There are known processes for obtaining chlorine from ammonium chloride and from hydrogen chloride in which the overall effects are oxidations which may ideally be represented respectively by the equations $$4NH_4Cl + O_2 = 4NH_3 + 2H_2O + 2Cl_2$$
$$4HCl + O_2 = 2H_2O + 2Cl_2$$

Any departure from the effects respective by these equations is generally due to undesirable side reactions. The first equation may be considered as occurring in two stages, namely $$4NH_4Cl = 4NH_3 + 4HCl$$

and then $$4HCl + O_2 = 2H_2O + 2Cl_2$$

and at given temperatures and pressures the minimum energy requirements for any cyclic process whose overall effect is as represented by the first two equations can never be less than those involved in these two stages.

Thus, in order to achieve a technical advance over known processes it is necessary to discover more convenient ways of bringing about the overall result. One of these is the subject of U.S. Serial No. 194,724, now U.S. Patent No. 3,103,419, which describes a four-stage cyclic process in whose second stage ammonium chloride and cuprous chloride and ammonia are reacted with oxygen or air in an aqueous system to give a cupric chloride ammine, the latter being subsequently heated in the third stage to liberate the ammine ammonia and give cupric chloride.

We have now found a method of obtaining cupric chloride from ammonium chloride and cuprous chloride in only one stage and without the need to add ammonia to the reaction environment.

According to our invention, in a cyclic process for making chlorine comprising three consecutive stages in the first of which ammonium chloride is formed from ammonia by known methods and in the third of which by known methods cupric chloride is heated to liberate chlorine and form cuprous chloride, the characteristic feature that in the second stage dry ammonium chloride from the first stage is heated with cuprous chloride from the third stage and another metal chloride chosen from the group consisting of alkali metal chlorides and alkaline earth metal chlorides, in the presence of oxygen, whereby ammonia is liberated and cupric chloride formed, thereafter said ammonia being returned to the first stage and said cupric chloride being sent to the third stage.

Among the other metal chlorides with which the cuprous chloride and ammonium chloride are heated in the presence of oxygen or air are those of the alkali metals and alkaline earth metals. Particularly useful is potassium chloride in a proportion of 40 to 50 mole percent. Thus, a typical reaction mixture would contain 30 to 25 moles each of ammonium chloride and cuprous chloride and 40 to 50 moles of potassium chloride. Sodium chloride and calcium chloride may be used.

The preferred temperature range for the reaction between cuprous chloride and ammonium chloride and oxygen is 200°–220° C. Higher temperatures enable a higher initial partial pressure of ammonia to be developed but only at the cost of a considerable decrease in the proportion of ammonium chloride converted.

The rate of reaction between cuprous chloride and ammonium chloride and oxygen appears to be proportional to the rate of oxygen-flow over or through the mixture of chlorides. The reaction mass may if desired be supported on inert materials, for example alumina or silica, and whilst as would be expected the support has little significant effect on the reaction rate or equilibrium it does help to sustain the reaction towards the end of its course when the reaction mass tends to become impermeable to the oxygen.

The mixture of cupric chloride and the other metal chloride formed by the reaction between ammonium chloride, cuprous chloride, other metal chloride and oxygen is heated to a higher temperature to liberate chlorine and regenerate cuprous chloride. The temperature is generally above 500° C. and it is usually convenient to remove the chlorine in a stream of an inert carrier gas.

If elementary chlorine is not required from the third stage of the process a substance or substances may be introduced into this stage of the reaction system that can react with chlorine, for example carbon monoxide, saturated hydrocarbons particularly methane, olefines, acetylenes, whereby the corresponding chlorine derivatives are obtained. It is usually possible to bring this about at lower temperatures than are required to give satisfactory yields of elementary chlorine.

The invention is illustrated by the following examples.

Example 1

A dry mixture of 297 g. (3 moles) of cuprous chloride, 160.5 g. (3 moles) of ammonium chloride and 298 g. (4 moles) of potassium chloride was supported on alumina-silica granules in a tube and heated at 220° C. in a current of dry oxygen flowing at a rate of about 670 ccms./minute until no more reaction was taking place. Analysis of the vapours issuing from the tube showed the partial pressure of ammonia in them to be 7.3 mms. Hg. Ammonium chloride converted to ammonia amounted to 80%, 8.6% volatilised unchanged and 4% remained in the reaction mass; the loss of ammonium chloride was thus 7.4%.

Example 2

In this example the results of four separate experiments are given which show the effect of temperature on the course of the reaction. In all experiments the dry reaction mixture consisted as in Example 1 of 297 g. cuprous chloride, 160.5 g. ammonium chloride and 298 g.

potassium chloride supported on alumina-silica granules and the oxygen flow-rate was about 335 ccms./minute. Equilibrium was considered to have been reached when no further reaction occurred between the mixture and oxygen.

| Expt. | Temp., °C. | Percent NH$_4$Cl converted to NH$_3$ | Percent NH$_4$Cl volatilised unchanged | Percent NH$_4$Cl remaining in residue | Percent NH$_4$Cl lost | Initial partial pressure of NH$_3$, mms./Hg |
|---|---|---|---|---|---|---|
| 1 | 210 | 84.7 | 7.3 | 2.2 | 5.8 | 4.3 |
| 2 | 220 | 73.5 | 1.7 | 12.2 | 12.6 | 6.3 |
| 3 | 228 | 57.0 | nil | (¹) | | 10.8 |
| 4 | 235 | 38.4 | 0.4 | (¹) | | 11.8 |

¹ Not determined.

These results show that the obvious way of increasing the partial pressure of ammonia, namely by working at higher temperatures, is not practicable since the percentage conversion of ammonium chloride rapidly diminishes as temperature increases.

What we claim is:

1. A cyclic process for making chlorine comprising the steps of forming ammonium chloride from ammonia in a first stage and drying the resulting chloride; heating the dry ammonium chloride in a second stage with cuprous chloride and another metal chloride selected from the group consisting of alkaline metal chlorides and alkaline earth metal chlorides in the presence of oxygen whereby ammonia is liberated and cupric chloride is formed; returning the thus liberated ammonia to said first stage for the formation of additional ammonium chloride; heating the cupric chloride from said second stage in a third stage to liberate chlorine and form cuprous chloride and returning the resulting cuprous chloride to said second stage.

2. The process of claim 1 in which the ammonium chloride in said second stage is heated with the cuprous chloride and the other metal chloride in the presence of oxygen at a temperature from 200° to 220° C.

3. The process of claim 1 in which the other metal chloride is potassium chloride.

4. The process of claim 1 in which from 25 to 30 mol percent of ammonium chloride is heated in said second stage with from 25 to 30 mol percent of cuprous chloride and from 50 to 40 mol percent of potassium chloride as the other metal chloride.

References Cited in the file of this patent

UNITED STATES PATENTS

| | | |
|---|---|---|
| 1,453,060 | Bosch et al. | Apr. 24, 1923 |
| 1,814,822 | Britton et al. | July 14, 1931 |
| 2,418,931 | Gorin | Apr. 15, 1947 |